United States Patent [19]

Guth et al.

[11] 4,326,143
[45] Apr. 20, 1982

[54] PIEZOELECTRIC ACCELERATION PICK-UP

[75] Inventors: Werner Guth, Zug; Peter Wolfer, Kleinandelfingen; Hanspeter Dähler, Winterthur; Reto Calderara, Bern, all of Switzerland

[73] Assignee: Kistler Instrumente AG, Winterthur, Switzerland

[21] Appl. No.: 951,045

[22] Filed: Oct. 13, 1978

[30] Foreign Application Priority Data

Oct. 25, 1977 [CH] Switzerland .................. 13055/77

[51] Int. Cl.³ ........................................ H01L 41/08
[52] U.S. Cl. .................................... 310/329; 310/333
[58] Field of Search ............... 310/329; 340/17 R; 73/517 R

[56] References Cited

U.S. PATENT DOCUMENTS

| | | | |
|---|---|---|---|
| 3,185,869 | 5/1965 | Shoor | 310/329 X |
| 3,389,276 | 6/1968 | Gradin et al. | 310/329 X |
| 3,390,286 | 6/1968 | Gradin et al. | 310/329 |
| 3,749,948 | 7/1973 | Morris | 310/329 X |
| 3,911,388 | 10/1975 | Crump et al. | 310/329 X |

Primary Examiner—Mark O. Budd
Attorney, Agent, or Firm—Craig and Antonelli

[57] ABSTRACT

The invention relates to an acceleration pick-up which can be produced at favorable cost in large numbers, for which new constructional means are used. The apparatus consists of a mushroom-shaped support screw (6,56), which is inserted directly in the synthetic material housing (8) of the measuring device and which mounts and retains both the mass sensor arrangement (1, 2, 3, 4), the printed circuit board (15) as well as the housing cover (9). In the immediate vicinity of the mushroom-shaped head (7) at least one flat holding magnet (30) is likewise inserted directly in the synthetic material housing (8). In order to screen the sensor arrangement against disturbance effects, the inside of the synthetic material housing is coated with a conducting metal layer (26,28,66) for inner screening, which is connected to the screening of the connecting cable piezoelectric, piezoresistive, inductive or other systems can be used as sensor elements.

9 Claims, 2 Drawing Figures

PIEZOELECTRIC ACCELERATION PICK-UP

The invention relates to a measurment pick-up, which serves for measuring accelerations.

The latter is a mechanical/electrical transducer in the form of a small appliance, which is attached to the object to be checked and accompanies all the movements of the latter and which is electrically connected to a recording device and which, according to the momentary component of acceleration in a certain direction, transmits a linear dependent signal to the recording device. These acceleration pick-ups are mainly used for registering vibrations on machines, appliances, parts of buildings, vehicles or underground. The reason for this registration of vibrations may be that one wishes to study the form and amplitude of the vibrations in order to eliminate the cause or that one only wishes to carry out monitoring in order to eliminate excessive trouble or danger or even, when grinding surfaces for example, to protect the latter from damage due to excessive vibrations. Acceleration pick-ups are very frequently used for the general monitoring of vibrations and measurement even when one has no particular interest in the acceleration itself. Other characteristic values of vibration, such as vibration speed and vibration amplitude can be obtained from the acceleration signal by electrical integration without great expenditure. However, there are also measurement transducers which are able to record the vibration speed or vibration path of a vibration directly. However, the latter contain moving parts which are subject to wear over a period of time and are also dimensionally substantially larger than acceleration pick-ups, which contain no moving parts and are more reliable. In principle, the piezoelectric acceleration pick-up consists of a solid base plate with an attachment device, generally a screw bolt, which makes it possible to screw this base plate to the object to be checked. Located on the base plate is a seismic mass, which is mounted on a tubular piezo element. The seismic mass and tubular piezo element are generally located in a housing, which is attached to the base plate, which has nothing to do with the actual measuring process. When vibrations occur, the seismic mass must be accelerated to and fro, for which forces are necessary. The forces are transmitted to the seismic mass by way of the tubular piezo element and the base plate. The compressions and expansions of the tubular piezo element produce piezoelectric charges, which are diverted electrically and supplied to an amplifier device. The principle is not new and has been described many times. In this respect reference should be made to the relevant text book "Einführung in die piezoelektrische Messtechnik" (Introduction to the piezoelectric measuring technique) by Werner Gohlke, Leipzig 1959. Numerous publications about piezoelectric acceleration pick-ups exist, which describe very many modifications and adaptations. However, nothing has changed as regards the basic principle, but the construction is more or less suitable or expensive.

The present invention relates to a new construction of an acceleration pick-up, which is characterised by particular simplicity and suitability.

The object of the invention will be illustrated with reference to two figures.

Figure 1:
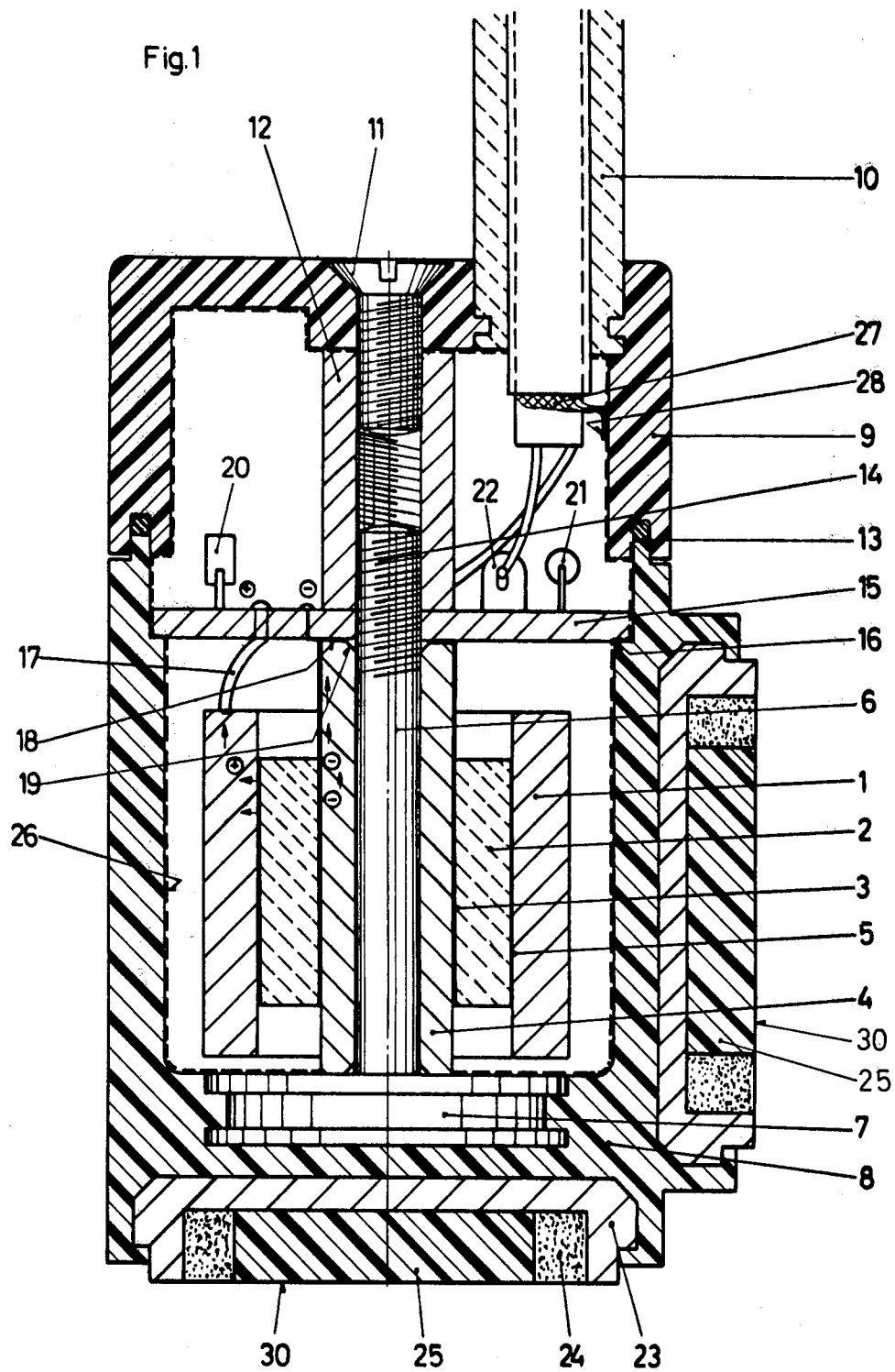
FIG. 1 shows an acceleration pick-up according to the invention with a piezoelectric thrust member in section.

According to FIG. 1, the reference numeral 1 designates the seismic mass in the form of a tubular member consisting of metal, which contains wolfram for example and the reference numeral 2 designates a tubular piezo element whose outer cylindrical surface is connected to inner cylindrical surface of the seismic mass 1 by known means. For the connection, one may chose a two-component silver epoxy adhesive, which on the one hand ensures good adhesion and on the other hand ensures a good removal of charge due to its conductivity. The tubular piezo element 2 is in turn stuck to the tubular bearing element 4 constructed as a bearing member, for example likewise with an electrically conductive adhesive connection 3. These adhesive connections 3 and 5 could be eliminated and replaced for example by a shrinkage fit or press fit so that the adhesion of the parts 1, 2 and 4 to each other is achieved solely by friction. However, this would necessitate pre-tensioning, which could influence the polarisation of the tubular piezo element 2, so that this element 2 would exhibit pyro effects, which one wishes to avoid. Furthermore, one must also expect a change in the pre-tensioning due to temperature, which would also indirectly cause a pyro effect. The seismic mass 1 consisting of metal for example and the tubular piezo element 2 both have low coefficients of thermal expansion. The tubular bearing element 4 must therefore likewise be produced from ceramic with a matched low coefficient of thermal expansion, in order that thermal stresses do not occur between the individual tubular parts, which could loosen the electrically conductive adhesive connections 3 and 5 or lead to undesirable indirect pyro effects. The tubular bearing element 4 forms a compact unit with the other parts 1, 2, 3 and 5, which unit can be slid loosely onto the mushroom-shaped support screw 6. The support screw 6 has a mushroom-shaped head 7 which by means of suitable profiling is inserted and firmly anchored in the synthetic material housing 8. The synthetic material housing 8 also comprises a housing cover 9, completely connected with a cable connection 10. The housing cover 9 and the synthetic material housing 8 are connected by a screw 11 which is screwed into the spacer nut 12 and sealed by the joint ring 13. The spacer nut 12 is screwed onto the threaded part 14 of the support screw 6 such that the printed circuit board 15 is simultaneously held on the stop face 16 and effects stressing of the piezo element 2 via the tubular bearing element 4. The seismic mass 1 produces tangential stresses in the tubular piezo element 2 in the cylindrical sectional planes at right-angles to the radius. These produced piezoelectric charges are passed by way of the electrically conductive adhesive connections 3 and 5. The $\oplus$ charges of the adhesive connection 5 are shunted to the seismic mass 1 and from there pass by way of the wire connection 17 to the electronic circuit on the printed circuit board 15. The $\ominus$ charges of the inner adhesive connection 3 pass by way of the cylindrical surface of the tubular bearing element 4 to the metallized end face 18, which is closed off by an insulating cone 19. From there, the $\ominus$ charges pass according to known means to the circuit of the printed circuit board 15. Located on the printed circuit board 15 are the electrical components of a pre-amplifier, for example a junction gate field effect transistor 20, a resistor 21, a terminal lug 22, which serves for the connection of the inner conductor of the cable connection 10. Located in the synthetic material housing 8 are two holding magnetic units for example, consisting of the soft iron housing 23, the casting compound 24 and the permanent magnets 25. The parts 23, 24 and 25 are produced and checked before insertion in the synthetic material housing 8. Alloys consisting of iron, nickel, cobalt and rare earths appropriately serve as the material for the permanent magnets 25, so that despite small dimensions of the permanent magnets 25, they have adequate holding strength. Two holding magnets 30 are appropriately inserted in the housing, so that their holding surfaces from an angle of 90° with respect to each other. When the out-of-balance movements of the machine to be investigated are located in a plane which is at right-angles to the axis of the support screw 6, no acceleration occurs in the axial direction and an acceleration pick-up located in this way receives no signal. If the pick-up is then placed with the other magnet rotated through 90°, the full acceleration is received in the axial direction, so that with two such magnets it is always possible to find a position in which the acceleration pick-up emits a signal. The synthetic material housing 8 and the housing cover 9 are provided with a metal layer 26 for inner screening, which covers the entire inside of the housing. The purpose of the screening is that electrical fields cannot induce disturbing charges in the measurement system, in particular at the amplifier input, from outside. The screening layer may be two-component silver epoxi adhesive, which has already been mentioned. However, single component conducting coatings based on silver or carbon also are suitable. Two-component silver epoxy adhesives are therefore particularly suitable, because the transfer from the cable screening 27 to the metal layer 26 for inner screening can be produced without difficulty by electrical conduction, which is facilitated by a simple adhesive point. The connection of the housing cover 9 and the synthetic material housing 8 must occur such that the components of the metal layer 26 for inner screening overlap each other without a gap and make contact with each other. However, it is also possible to produce the housing cover 9 from metal, due to which additional metallization is dispensed with. It is only important that the housing 8 consists of synthetic material, since only this component is mounted on the object to be measured and is thus connected with a possible disturbance potential. However, the synthetic material housing 8 provides complete separation of the highly sensitive measuring parts from the outside world.

Figure 2:
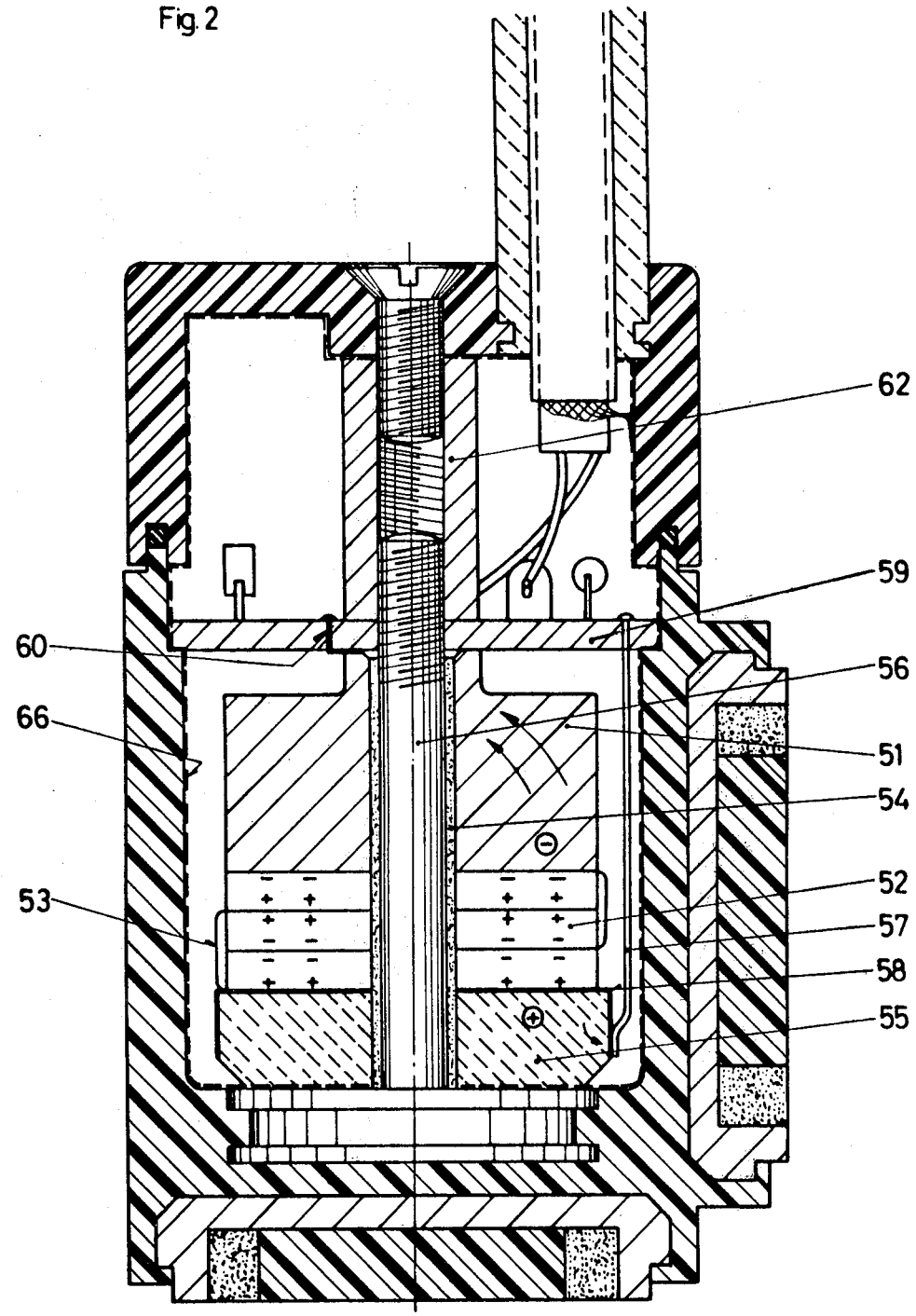
FIG. 2 shows an acceleration pick-up according to the invention with a piezoelectric compression member in section.

FIG. 2 shows a variation according to the invention of FIG. 1. The plate-shaped seismic mass 51 of metal is pressed with mechanical pretensioning on the piezoelectric element 52, which may consist of one or more perforated plates by screwing of the screw 56 into the spacer nut 62. The plates are stacked in known manner and provided with electrodes 53. A small insulating tube 54, for example of Teflon, is slid onto the support screw 56, which tube centres all the parts and insulates them from the metal layer 66 for inner screening. The base plate 55 consists of ceramic material which is provided with a conducting layer 58 at the appropriate points. The signal lead 57 is connected directly to this conducting layer 58 and connects the latter to the amplifier on the printed circuit board 59. The charge of opposed polarity is passed through the seismic mass 51 directly to the amplifier on the printed circuit board 59 by way of the conductor 60. All the other parts correspond to FIG. 1.

Instead of the conducting coatings which are sprayed on inside the synthetic material housing, metal coatings may also be used which are applied galvanically, deposited by vapourization or sprayed on.

The invention intends to produce a high quality acceleration pick-up economically. Together with the incorporated holding magnets, the synthetic material housing facilitates simple assembly and complete electrical separation from the object to be measured. Internal metallization of the plastics surfaces also provides complete screening with regard to any hum pick-up from outside.

The arrangement of the support screw, firmly anchored in the synthetic material housing, facilitates simple and reliable assembly and mounting of the sensor element, also reliable mounting of the printed circuit board, on which the connections to the sensor member can be made in a simple manner and finally a simple solution to the sealing and mounting problem of the cover and connecting cable combination.

The invention achieves a plurality of purposes with simple means, which is the basis of an economical solution.

The acceleration pick-up may naturally be connected to the machine part to be measured without holding magnets, for example by a flange arrangement of the housing or by mounting screws.

In place of a piezoelectric measuring element, it is also possible to use a piezoresistive member or a measuring member operating on an inductive DMS or capacitive basis, which is located in the synthetic material housing with the same support screw construction.

We claim:
1. Vibration and acceleration pick-up comprising a mass sensor arrangement coupled with an electronic amplifier, the mass sensor arrangement and electronic amplifier being disposed within a synthetic material housing, the mass sensor arrangement being coaxially arranged about a support screw means with a mushroom shaped head which is anchored in the synthetic material housing and retains, spaces and stresses the sensor arrangement, the amplifier and a cover for the synthetic material housing in one unit, the inner surface of the synthetic material housing being provided with a conducting layer which is connected to the cable screening of an output cable of the electronic amplifier.

2. Vibration and acceleration pick-up according to claim 1, characterized in that the mass sensor arrangement comprises a piezoelectric thrust member with a seismic mass, a tubular piezoelectric element and a tubular bearing element of electrically insulating material arranged coaxially about the support screw means, the tubular bearing element having a conductive coating along at least a portion of the surface thereof and along an end face thereof, the conductive coating serving as a signal transmission means to a printed circuit board of the amplifier.

3. Vibration and acceleration pick-up according to claim 1, characterized in that the mass sensor arrangement comprises a piezoelectric compression element arranged coaxially about the support screw means including a seismic mass, piezoelectric element, electrodes and base plate which are centered by a small insulating tubular bearing element and pre-tensioned by a spacer nut, a signal lead and conductor being provided which transmit the signals directly to a printed circuit board of the amplifier.

4. Vibration and acceleration pick-up according to claim 2 or 3, characterized in that the printed circuit board is held against a stop face of the housing and the tubular bearing element is held against the mushroom-shaped head of the support screw means, and that also the housing cover is held against a joint ring on the housing.

5. Vibration and acceleration pick-up according to claims 1, 2, or 3 characterized in that incorporated into the synthetic material housing are two holding magnets, one holding magnet being pre-mounted and insulated electrically from the mushroom-shaped head of the support screw moves and located in front of the support screw.

6. Vibration and acceleration pick-up according to claim 5, characterized in that the second holding magnet is fixed in the synthetic material housing in a plane inclined through 90° with respect to the one holding magnet.

7. Vibration and acceleration pick-up according to claim 5, characterized in that the holding magnets comprise a soft iron housing, a disc-shaped permanent magnet and an annular casting compound.

8. Vibration and acceleration pick-up according to claim 1 characterized in that the housing cover is equipped with an integral cable connection.

9. Vibration and acceleration pick-up according to claim 1, characterized in that the mass sensor arrangement consists of a piezo resistive sensor member arranged coaxially about the support screw means.

* * * * *